A. L. SWEET.

Assignor to THE BACON ARMS CO.

Revolving Fire Arm.

No. 9,704. Reissued May 10, 1881.

Attest:

R. F. Barnes.

F. L. Middleton.

Inventor:

Monzo L. Sweet.

by Ellis Spear

Attorney

N. PETERS, Photo-Lithographer, Washington, D. C.

BEST AVAILABLE COPY

UNITED STATES PATENT OFFICE.

ALONZO L. SWEET, OF NORWICH, CONNECTICUT, ASSIGNOR TO THE BACON ARMS COMPANY, OF SAME PLACE.

REVOLVING FIRE-ARM.

SPECIFICATION forming part of Reissued Letters Patent No. 9,704, dated May 10, 1881.

Original No. 210,725, dated December 10, 1878. Application for reissue filed April 11, 1881.

*To all whom it may concern:*

Be it known that I, ALONZO L. SWEET, of Norwich, in the county of New London and State of Connecticut, have invented certain new and useful Improvements in Revolving Fire-Arms; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to revolving fire-arms; and it consists of an improved stop mechanism of simple and inexpensive construction, whereby the cylinder is locked in proper position for discharging or in discharged position, at all times, excepting when at half-cock. Numerous devices have been described or used, and are well known for this general purpose of securely locking and unlocking the cylinder at the proper times, and no particular description of them is deemed necessary.

The main object of this invention is to secure the same certainty of operation as that heretofore attained, by fewer parts and a simple and cheaper structure.

I have hereinafter particularly described my improvements in connection with other and old parts, and have specifically pointed out my invention in the claims.

Figure 1:
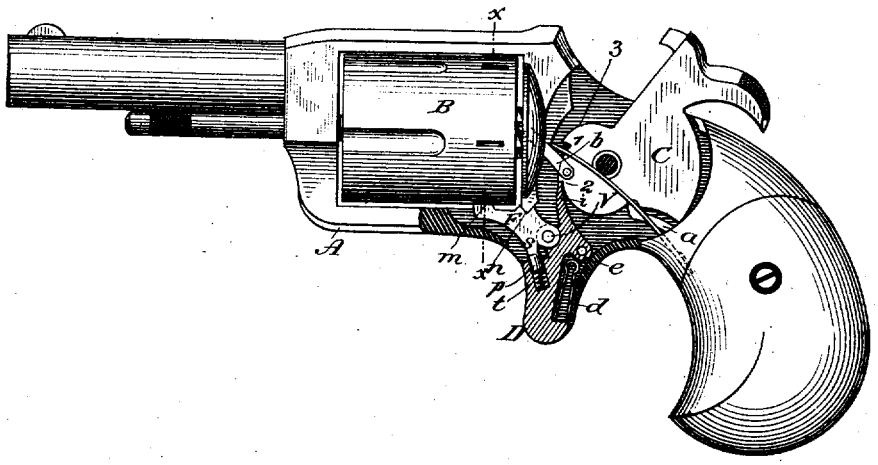
Figure 2:
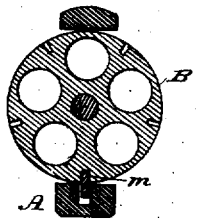

The annexed drawings, to which reference is made, represent, in Figure 1, a section of the working parts of a revolver embodying my invention. Fig. 2 is a transverse section on line *x x* of Fig. 1.

A represents the frame of a revolver with recoil-shield. B is the cylinder. C is the hammer, having the two notches 1 2 for half-cock and full-cock. *a* is the hammer-spring. *b* is the arm or pawl pivoted on the hammer and passing through a slot in the recoil-shield to engage with the ratchet on the end of the cylinder for rotating the same.

The trigger is shown at D, and is pivoted on its rear upper projection, *e*, the ordinary spring *d*, for throwing it forward, being located in a recess below the pivot.

The stop is represented at F. It lies in a groove, *f*, in the lower strap of the frame, which groove extends rearward under the lower edge of the recoil-shield *n*. When placed in this groove the forward end of the stop F may be pressed up, so that said forward end *m* may rise above the interior surface of the strap and project into the notch in the cylinder, by which said cylinder is locked. The rear end of the stop F extends back to the trigger D, to which it is connected at a point, *v*. The upper edge of the stop F bears against the lower edge of the recoil-shield, as shown at *n*.

It will be observed that the point of connection *v* between stop F and trigger D is in such relation to the pivotal point *e* of the trigger and the bearing or fulcrum *n* of the stop that motion of the pivotal end of F up will fulcrum the stop over the edge of the recoil-shield and depress the front end of the stop. For the effectual working of this stop it is necessary that it should be pressed upward in order to interlock with the notches of the cylinder. This is effected by means of a spring, *t*, in a hole in the trigger, which spring presses a pin, *p*, upward against a projection, *s*, on the lower edge of the stop.

An ordinary point, *i*, on the upper end of the trigger bears against the cam-face of the hammer. When this rests upon the high part 3 of said cam-face the point *v* is depressed, the front end of F raised, and the cylinder locked. Upon raising the hammer the point *i* falls into the half-cock notch 1, letting the spring *d* throw forward the trigger, and thus throw up the rear end of the stop F and unlock the cylinder. The cam-face is low from this half-cock notch a sufficient distance to allow the cylinder to turn its notch out of register with the stop, and then rises as high as the high part 3, so as to press forward (see Fig. 1) the spur *i*, thereby depressing the stop and giving it spring-tension enough to force the stop into the next notch in the cylinder as soon as it comes into line.

As in the act of firing the trigger is drawn back, it is evident that the connected rear end of the stop will then be depressed and the front end locked into the cylinder, and that the cylinder is unlocked only at the moment when in cocking the point *i* falls into the notch 1, and thereafter in the ordinary motion till the stop falls into the next notch. No adjustment of the parts is needed, except to fit the stop in the slot, and then to see that the forward end does not rise too far when the piece is at half-cock, it being necessary that the cylinder should ride freely over the stop when said stop is down.

Having thus described my invention, what I claim as new, and desire to secure, is—

1. In a revolving fire-arm, the stop F, located in a groove in the lower strap and fulcrumed on the lower edge of the recoil-shield, in combination with a spring underneath said stop and with the trigger, substantially as described.

2. The trigger D, pivoted at *e*, in combination with a stop, F, located in a groove in the lower strap, having its fulcrum on the lower edge of the recoil-shield, and having also a spring underneath it, said trigger operating said stop at the point *v*, substantially as described.

3. The combination of the trigger D, pivoted at *e*, and having the point *i*, with the stop F, connected thereto at *v*, said stop being fulcrumed on the edge of the recoil-shield, and being also forced upward by a spring, substantially as described.

4. In a revolving fire-arm, the combination of the trigger, the stop jointed to the trigger, a fulcrum on and below the recoil-shield for the stop, and a spring in the trigger for adjusting the stop, all substantially as and for the purposes set forth.

In testimony whereof I have hereunto set my hand.

ALONZO L. SWEET.

In presence of—
NORRIS G. LIPPITT,
STEPHEN B. MEECH.